(12) United States Patent
Wilkerson et al.

(10) Patent No.: US 6,393,525 B1
(45) Date of Patent: May 21, 2002

(54) LEAST RECENTLY USED REPLACEMENT METHOD WITH PROTECTION

(75) Inventors: Christopher B. Wilkerson, Beaverton; Nicholas D. Wade, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/314,233

(22) Filed: May 18, 1999

(51) Int. Cl.⁷ .............................................. G06F 12/00

(52) U.S. Cl. ........................ 711/136; 711/129; 711/156; 711/159; 711/160

(58) Field of Search ...................... 711/128–129, 136, 711/159–160, 156

(56) References Cited

U.S. PATENT DOCUMENTS

| | | | | |
|---|---|---|---|---|
| 5,778,442 A | * | 7/1998 | Ezzat et al. ................. | 711/159 |
| 5,974,507 A | | 10/1999 | Arimilli et al. ............. | 711/133 |
| 6,105,111 A | * | 8/2000 | Hammarlund et al. ...... | 711/136 |
| 6,138,213 A | * | 10/2000 | McMinn ..................... | 711/137 |

OTHER PUBLICATIONS

"Method for improving least recently used buffer performance using multiple stack insertion points based on data types", *IBM Technical Disclaosure Bulletin*, 36 (8), pp. 479–480, (Aug. 1993).

Karedla, R., et al., "Caching strategies to improve disk system performance", *Computer*, 27 (3), pp. 38–46, (Mar. 1994).

* cited by examiner

*Primary Examiner*—Matthew M. Kim
*Assistant Examiner*—Pierre M. Vital
(74) *Attorney, Agent, or Firm*—Schwegman, Lundberg, Woessner & Kluth, P.A.

(57) ABSTRACT

An LRU with protection method is provided that offers substantial performance benefits over traditional LRU replacement methods by providing solutions to common problems with traditional LRU replacement. By dividing a cache entry list into a filter sublist and a reuse list, population and protection processes can be implemented to reduce associativity and capacity displacement. New cache entries are initially stored in the filter list, and the reuse list is populated with entries promoted from the cache list. Eviction from the filter list and reuse list is done by a protection process that evicts a data entry from the filter, reuse, or global cache list. Many variations of protection and eviction processes are discussed herein, along with the benefits each provides in reducing the effect of unwanted displacement problems present in traditional LRU replacement.

22 Claims, 3 Drawing Sheets

LRUP GLOBAL LIST WAY TABLE

| L BITS / WAY | 0 | 1 | 2 | 3 | 4 | 5 | REUSE |
|---|---|---|---|---|---|---|---|
| 0 | 0 | 0 | 0 | – | – | – | 0 |
| 1 | 1 | – | – | 0 | 0 | – | 1 |
| 2 | – | 1 | – | 1 | – | 0 | 1 |
| 3 | – | – | 1 | – | 1 | 1 | 0 |

XX=0
X1=1
01=0
0X=0
00=0
11=1

EXAMPLE: (APPLY MASKS 0,3)

| | | | | | | | |
|---|---|---|---|---|---|---|---|
| OLD | 0 | 0 | 0 | 0 | 0 | 0 | 0 |
| NEW | 0 | 0 | 0 | 0 | 0 | 1 | 1 |

LRU WAY TABLE

| j \ i | 0 | 1 | 2 | 3 |
|---|---|---|---|---|
| 0 | – | 0 | 1 | 3 |
| 1 |  | – | 2 | 4 |
| 2 |  |  | – | 5 |
| 3 |  |  |  | – |

UPDATE TABLE

| WAY USED \ L BITS CHANGED | 0 | 1 | 2 | 3 | 4 | 5 |
|---|---|---|---|---|---|---|
| 0 | 1 | 1 | – | 1 | – | – |
| 1 | 0 | – | 1 | – | 1 | – |
| 2 | – | 0 | 0 | – | – | 1 |
| 3 | – | – | – | 0 | 0 | 0 |

1=USED MORE RECENTLY

FIG. 2

VICTIM SELECTION DECODE

| WAY SELECTED \ L BIT MASK | 0 | 1 | 2 | 3 | 4 | 5 |
|---|---|---|---|---|---|---|
| 0 | 0 | 0 | - | 0 | - | - |
| 1 | 1 | - | 0 | - | 0 | - |
| 2 | - | 1 | 1 | - | - | 0 |
| 3 | - | - | - | 1 | 1 | 1 |

FIG. 3

LRUP GLOBAL LIST WAY TABLE

| WAY \ L BITS | 0 | 1 | 2 | 3 | 4 | 5 | REUSE |
|---|---|---|---|---|---|---|---|
| 0 | 0 | 0 | 0 | - | - | - | 0 |
| 1 | 1 | - | - | 0 | 0 | - | 1 |
| 2 | - | 1 | - | 1 | - | 0 | 1 |
| 3 | - | - | 1 | - | 1 | 1 | 0 |

EXAMPLE: (APPLY MASKS 0,3)

| | 0 | 1 | 2 | 3 | 4 | 5 | |
|---|---|---|---|---|---|---|---|
| OLD | 0 | 0 | 0 | 0 | 0 | 0 | 0 |
| NEW | 0 | 0 | 0 | 0 | 0 | 1 | 1 |

LEAST RECENTLY USED REPLACEMENT METHOD WITH PROTECTION

FIELD OF THE INVENTION

The invention relates generally to replacement of cached data in an electronic computer system, and more specifically to a least-recently-used replacement method that protects against undesirable replacement.

BACKGROUND OF THE INVENTION

Cache memory is often utilized in high-performance computing systems where fast system speeds require fast and expensive memory to access data at full speed. The faster a processor operates, the more quickly it must retrieve data and instructions from memory. This requires memory that can be accessed quickly, and due to the very high clock speeds often involved, the memory is typically located in close proximity to the processor. But, fast memory capable of operating as a cache is expensive, and locating large or custom amounts of memory close to the processor is often impractical. Therefore, a limited number of separate banks of cache memory, separate from a larger main system memory, are often placed near the processor core.

This cache memory typically consists of high-speed memory such as static random access memory (SRAM) and a cache controller. The controller manages data that is copied from the relatively slow main memory into the cache memory based on a prediction of what data the processor is likely to need soon. The cache memory often comprises between ten percent and one percent of the total system memory, but may vary over a greater range depending in part on the predictability of the memory access characteristics of the computing system.

Because successive memory accesses typically occur in a relatively small area of memory addresses, storing the most frequently accessed data in a cache can create significant improvements in system performance. Accessing this most frequently used data from the relatively fast cache memory eliminates forcing the processor to wait while the data is accessed from the slower main memory, and is referred to as a cache hit. If the data the processor needs is not located in cache but must be retrieved from main memory, the request is similarly said to be a cache miss.

The degree to which the cache effectively speeds up memory access can be measured by the number of memory requests that are cache hits and that are cache misses. It is the goal of the cache controller designer to place the data most likely to be needed by the processor in cache, maximizing the ratio of cache hits to cache misses. By employing such a scheme, the system can derive much of the benefit of having a high-speed memory, while reducing overall system cost by storing most data in relatively inexpensive lower-speed memory.

One such scheme for replacing less-often used data with more-often used data is to simply note which data stored in cache is least-recently used (LRU), and replace that data as new data is loaded into the cache. Such a method typically employs a number of LRU bits associated with each block of data stored in the cache, which contain data that indicate how long it has been since the data was last accessed. Such a scheme may displace data from a large set of data before it is needed again due to limited cache size. Further, the LRU algorithm may replace data that is used somewhat frequently with data that has been used more recently, even though the more recently used data is used much less frequently or only once. A method is therefore needed of ensuring that data that is more likely to be requested again is not replaced with data used more recently but less frequently.

SUMMARY OF THE INVENTION

A method of storing data in a cache memory system is provided. A cache data entry list records cache data entries stored in cache memory, and is divided into a filter list and a reuse list. The filter list is populated by storing all new cache data entries in the filter list, and the reuse list is populated by selectively promoting cache data entries from the filter list. Elements are evicted from the filter list and reuse list by operation of a protection process.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

A method is needed for improving an LRU cache memory system to reduce the effects of problems associated with simply evicting the least recently used cache data entry whenever additional cache space is needed. The present invention improves upon a simple LRU replacement policy, and addresses the problem of evicting data from a large data set before it is used again due to limited cache size. It also addresses the problem of replacing frequently used data with recently used data that is used less often. Solutions to both of these common LRU cache problems are provided in the present invention, and are explained in more detail below.

A typical cache memory has multiple memory cells with the same shortened address in different banks, where the banks are referred to as 'ways'. For example, a memory for a system with a 16-bit address length may have a 4-way cache, consisting of 4 banks of memory that each have an 8-bit address. When storing data from the main memory in cache, the eight most significant bits of the data main memory address are discarded, and the remaining 8 bits are the cache address into which the data is stored. Because there are four ways, or banks of memory, with the desired address, the way with the least recently used data is typically chosen as the way into which the data will be stored. This is because it is less likely that the least recently used data will be needed before the more recently used data that is stored in other memory ways. This assumption is not always correct, and the LRU data may in fact be used more frequently. Many different cache architectures and cache population and replacement algorithms exist, and the above description is only an example of one such multi-way cache employing a Least Recently Used (LRU) replacement algorithm.

The present invention includes an LRU algorithm designed to overcome the problems of capacity displacement and associativity displacement, which are common ways in which the data evicted from the cache memory are selected from a way containing data that is not the least likely to be used soon.

Capacity displacement occurs when data is used so infrequently that the least recently used data is actually more likely to be accessed soon than the data in more recently used ways. For example, capacity displacement affects an image editing process operating on an image made up of 32 kB worth of data that is stored in part in a 16 kB cache when the image must be accessed repeatedly. If the data bytes comprising the image are accessed sequentially and stored in cache on access, there will always be 16 kB worth of image information in the cache, but the process will need to access the other 16 kB worth of image information before again needing the information actually stored in cache. When the first part of the image file is reaccessed, the cache contains only the most recently used data from the second part of the image. Likewise, once the process requires the data from the second part of the image, it has been replaced with the more recently accessed data from the first part of the image. Such a process guarantees a high rate of cache misses, because the cache simply does not have the capacity to store all the data used repeatedly.

Another common way in which data is evicted from a cache is through associativity displacement. This happens when certain data is needed repeatedly, but is discarded as a large amount of less-frequently used data is accessed. For example, consider a cache with only four entries that handles a data structure A and a data element B. If the data is accessed in the order A1, A2, A3, A4, A5, B, A6, A7, A8, A9, B, A0, A1, A12, A13, A14, B, etc., the cache will never contain B but will contain the more recently used elements of data structure A. Although B is much more frequently used than any single element of the data structure A, traditional LRU algorithms provide no preference for frequently accessed data such as B.

Figure 1:
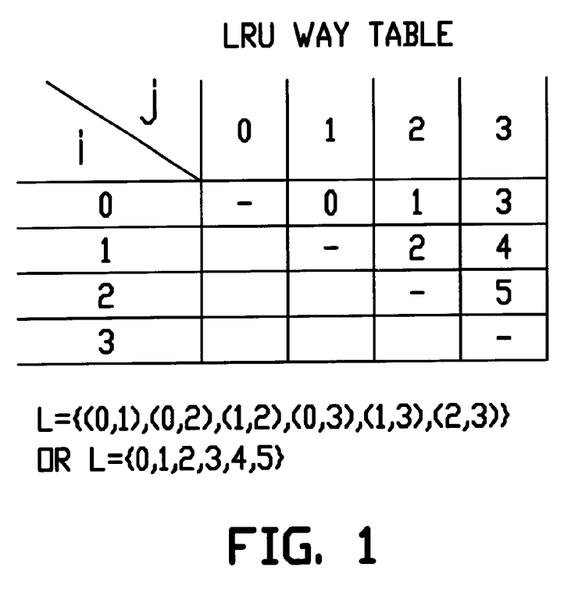
FIG. 1 shows a table representing a Least Recently Used (LRU) order matrix, consistent with an embodiment of the present invention.

To implement a LRU algorithm, a cache controller must process data indicating which ways have been most recently used for specific addresses within the ways. The cache controller is responsible for both storing the data regarding which ways have been most recently used, and decoding the data and deciding which way is least recently used and should be replaced with newly used data. FIG. 1 shows a table, illustrating in part one method of keeping track of which way has been least recently used for a particular address in a 4-way cache.

FIG. 1 shows a table comprising a two-dimensional matrix of elements (i,j) that can e used to record the order of use of the particular address within each way, where the element (i,j) is 1 if the data in way (I) has been used more frequently than the data in way (j), and is 0 if the data in way (I) has been used less frequently than the data in way (j). Note that the diagonal elements of the matrix at addresses (0,0) to (3,3) do not contain meaningful information as both (I) and (j) refer to the same way, and so can be ignored. Also, the elements on one side of this diagonal are the inverse of elements on the opposite side of the diagonal, such that if (3,2) is 1, meaning way 3 has been more recently used than way 2, then (2,3) must logically be 0 because way 2 cannot have been more recently used than way 3. Therefore, the elements on one side of the diagonal can be discarded along with the diagonal, leaving only the elements represented by numbers in the matrix as critical to recording order of use. These five numbered matrix elements can then be represented by a string of five bits, represented by an array L of the five matrix elements (i,j), where L={(0,1),(0,2),(1,2),(0,3), (1,3),(2,3)}, and where each of the bits contains a 1 if the element (I) has been used more recently than the element (j). These five bits of array L may be more easily referenced by single numbers, such that L=(0,1,2,3,4,5) and each bit corresponds to a matrix element in the order given in the previous matrix representation of array L.

Figure 2:
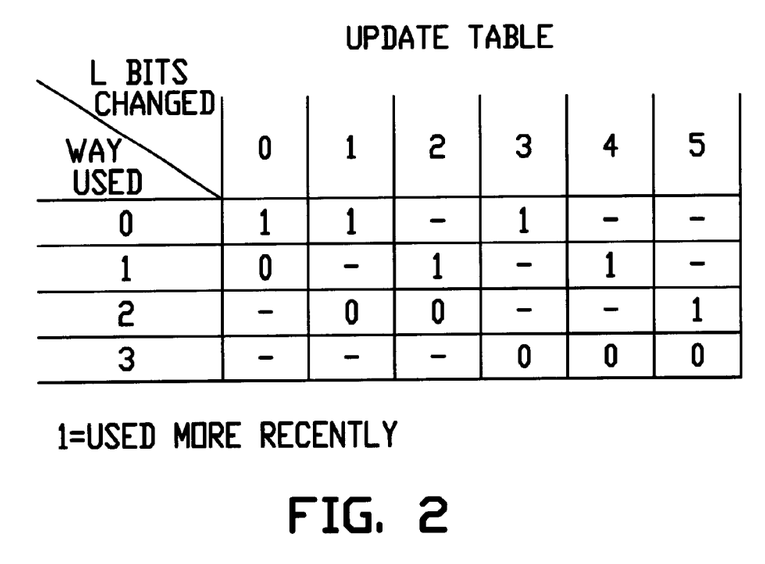
FIG. 2 shows a table representing bits in a multi-way LRU replacement cache word changed in response to access of data in a particular way, consistent with an embodiment of the present invention.

FIG. 2 illustrates an update table, which is used in the operation of this example of a cache to update the five bits of array L upon access of new data and writing of the newly accessed data to cache. The update matrix indicates which bits of L to change for a specific address, based on which way is used to store the newly accessed data. Because the cache is a 4-way cache and any one of the four ways may be selected for data storage, one axis of the matrix represents the four ways of the cache system. The other axis represents the five bits of array L that store data on which of the four ways has been most recently used, and correspond to the way accessed as represented in the other axis. For example, in operation where way two is determined to have the least recently used data for a specific address by inspection of word L, way two is to be replaced with incoming data. Finding way two on the way axis, the matrix indicates that bits 0, 3, and 4 remain unchanged, while bits 1 and 2 are reset to zero, and bit 5 is changed to one. Revisiting the matrix element notation version of array L, the equation indicates that setting bits 1 and 2 to zero indicates that way 0 has been less recently used than 2 and that way 1 has been less recently used than 2, respectively. Similarly, setting bit 5 to one indicates that way 2 has been more recently used than way 3. Further inspection of the matrix notation version of array L indicates that bits 0, 3, and 4 do not contain information about way 2, and so remain unchanged. By updating the bits according to this method after each write to cache, the array L always contains accurate information about the order of use of the ways of the cache and can be used by the cache controller to assign new data to the least recently used way of the cache.

Figure 3:
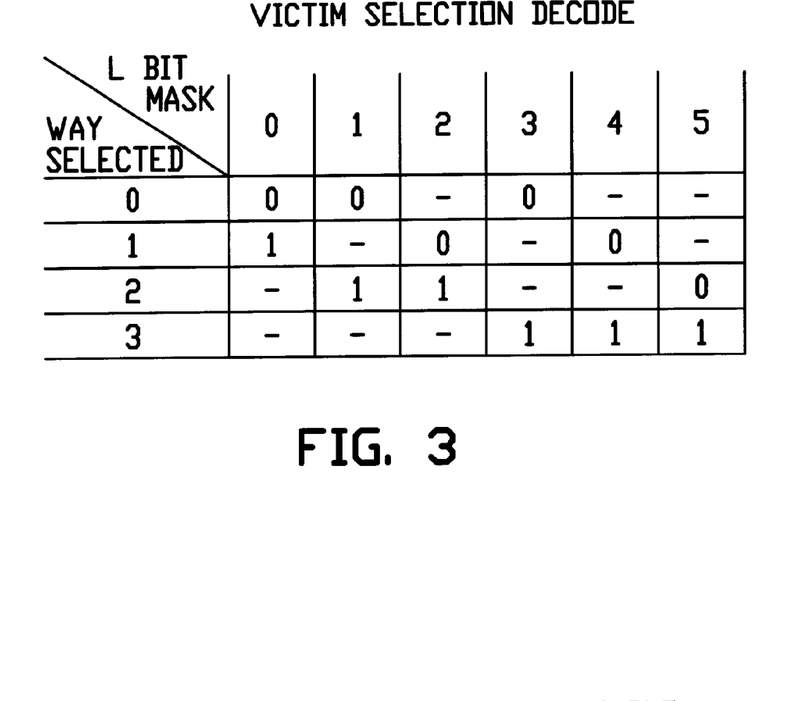
FIG. 3 shows a table representing decode masks used for victim selection a multi-way LRU cache replacement, consistent with an embodiment of the present invention.

The cache controller does this by using a victim selection table, which is simply the complement of the update table of FIG. 2. FIG. 3 shows a victim selection table for our example cache, such that all ones in the matrix are replaced with zeros and all zeros are replaced with ones, and all unchanged bits remain unchanged. Finding the complement of elements read from a matrix can be done quite easily in electronics or by other means, and so does not require maintaining a victim selection table but can be done with on-the-fly conversion of data from the update table of FIG. 2. Each element of FIG. 3 is used as a mask in operation, such that the contents of the masks are compared against the data stored in array L. If the data in any of the four masks matches the data in array L, the way associated with the mask is selected as the way that has been least recently used, and will be the target for new data. Note that the masks in FIG. 3 contain bit data that is mutually exclusive between ways, such that only one of the four masks can match any possible combination of bits in array L and indicate a specific mask as least recently used. This means the masks can be compared to array L simultaneously, and only one way will be selected as the target for a cache write operation.

For example, consider that the ways for a specific address have been used in the order 2,3,0,1, where way 1 is the most recently used and way 2 is the least recently used. Using the update table of FIG. 2, after all updates array L will contain the data L=(0,1,1,1,1,0). Comparing this word to the masks of FIG. 3, we find that for way 0, bits 0, 1, and 3 are incorrect; for way 1, bit 1 and 3 are incorrect; for way 2, bits 1, 2, and 5 are incorrect. For way 2, bits 1, 2, and 5 of the mask in the victim selection matrix match the data in array L, and so way 2 is properly selected as the least recently used way.

The example described in the previous paragraph is one example of LRU replacement in a cache system, and suffers from the shortcomings of a plain LRU replacement approach as previously discussed. The current invention improves upon the approach described above, and addresses the common problems of associativity and capacity displacement.

LRU with protection, or LRUP, includes the partitioning of the traditional LRU way list into at least two sub-lists. The traditional LRU way list of one embodiment is improved to include a reuse/filter bit for each way that indicates whether the data stored in that way is a part of a reuse or a filter sub-list. LRU ordering is maintained globally, and so any way from the LRU way to most recently used way may be part of either one of the reuse or filter lists, in addition to the global list. Various processes that manage the data in the reuse and filter lists independently are then tailored to address displacement problems, and optimize the performance of the LRUP cache.

In one embodiment of the invention, cache elements are initially allocated as part of the filter list. Selected elements from the filter list are promoted to the reuse list by a nomination process, to populate the reuse list. Because nominations cause a cache line to be moved from the filter list to the reuse list, continued nomination would cause the reuse list to grow indefinitely and eventually crowd out the filter list from the cache. Therefore, a protection process chooses between eviction of members of the reuse list or the filter list upon allocation of a new cache line to store incoming data to ensure proper distribution of elements between the filter and reuse lists.

Nomination of an element from the filter list to the reuse list may be done by a number of processes that are tailored to reduce unwanted displacement. Triggered nomination, which reduces associativity displacement, involves moving a cache line from the filter list to the reuse list if the data stored there is reused while in the filter list. Random nomination, which reduces capacity displacement, randomly selects newly allocated cache lines or cache lines from the filter list for inclusion in the reuse list. Combinations and variations on triggered nomination and random nomination are to be considered within the scope of the invention, and several exemplary embodiments of such are described below.

Triggered nomination may modify the simple rule that cache lines used while in the filter list are promoted to the reuse list by evaluating special circumstances under which it is less desirable to promote certain elements to the reuse list. For example, elements referenced while in the most recently used position of the global list may be reaccessed as part of a single operation or calculation, and so would be less likely to be reaccessed than elements accessed at two different times. These elements would then be excluded from promotion, but remain part of the filter list until later reuse or eviction. Similarly, elements referenced while in the most recently used position of the filter list may be excluded from promotion to the reuse list under triggered nomination, or elements within a number of more recently used positions of either the global or filter lists may be excluded from nomination.

Random nomination involves nomination of randomly selected cache lines to the reuse list. Variations on plain random nomination include using a random selection algorithm that monitors the size of the reuse list relative to the global list and makes random nomination increasingly unlikely as the reuse list grows. A number of other methods for randomly selecting data exist in addition to the examples discussed here, and are to be considered within the scope of the invention.

Combination of triggered nomination and random nomination may be employed to address both associativity and capacity displacement, and algorithms and variations of both may be selected to optimize the cache hit/miss ratio for specific cache configurations. For example, one nomination process embodiment consistent with the invention includes employing both a triggered nomination scheme excluding the most recently used element of the filter list, in addition to a random nomination algorithm wherein random nomination becomes increasingly unlikely as the size of the reuse list grows. Such a combination has the benefit of self-balancing nominations from the triggered nomination algorithm and the random nomination algorithm because the random nomination algorithm is dependent on the size of the reuse list. This will help stabilize the size of the reuse list, while still effectively addressing both associativity and capacity displacement.

The reuse list may also be populated by other nomination processes, such as by a classification scheme that promotes cache data entries to the reuse list based on specific characteristics of the data. Cache lines promoted by various nomination processes may promote data from the reuse list, may promote newly allocated cache data entries, or may promote cache data entries selected by another method. Combinations of nomination processes may be employed to address capacity and associativity displacement, or to address other cache inefficiencies. It is anticipated that other nomination processes for selecting cache lines for promotion to the reuse list exist and may be developed, and are to be considered within the scope of this invention.

Protection algorithms provide additional control over the size of the reuse list, by choosing between evicting elements from the global or filter list. Note that because the global list is comprised of both the filter list and the reuse list, evictions from the global list may be from either the reuse or filter lists. Two protection algorithms are described herein—a strike algorithm and a LRU counter algorithm.

The strike algorithm employs a strike counter to track the number of times that a memory access results in a cache miss while the least recently used element of the reuse list remains unchanged. A maximum allowable strike threshold is preset and is compared against the strike counter, such that once the strike counter value is greater than the maximum allowable strike threshold the LRU element of the global list is evicted. The longevity of an element in the reuse list can be increased by growing the reuse list or raising the maximum allowable strike threshold, but a larger maximum allowable strike threshold also results in increased longevity of elements in the global list. Therefore, lower maximum allowable strike thresholds are desirable for relatively large reuse lists, and higher thresholds are desirable for relatively small reuse lists. One embodiment of the strike algorithm therefore employs a method of varying the strike threshold, dependent on the size of the reuse list.

The LRU counter protection algorithm attempts to predict the cost of evicting a cache line from the reuse list versus evicting a line from the filter list. The counter tracks references to the LRU elements of both the filter and reuse lists, so that the estimated likelihood the LRU element of each list will be accessed can be compared. One embodiment of such a scheme employs a counter that starts at zero, and counts up for each reference to the LRU element of the reuse list and down for each reference to the LRU of the filter list. Alternatively, a hysteresis bit may be added to the counter, such that only the second reference to the LRU bit of either the filter list or reuse list without intervening reference to the LRU of the other list will increment or decrement the counter.

When an eviction is needed, the LRU counter value is used to determine the maximum allowable size of the reuse list, and to decide whether to evict a cache line from the reuse list or from the filter list. As an example, consider a case where eviction is needed in one embodiment and the counter holds a positive number indicating frequent access to the reuse list. The LRU counter value is then compared to a threshold value for the reuse list. If the counter value exceeds the threshold value a predetermined large list size is suggested, and if the counter value is smaller than the threshold value a predetermined small list size is needed. The selected predetermined list size is then compared to the actual size of the reuse list, and a line is evicted from the reuse list only if the predetermined size is smaller than the actual size of the reuse list. Otherwise, a line is evicted from the filter list. Note that a table may contain a number of predetermined threshold values and corresponding reuse list sizes, with the goal of further optimizing the size of the reuse list and eviction therefrom. Such a scheme serves not only to control the reuse list size, but also to evict data that is least likely to be used, whether it be from the filter or reuse list.

Managing a reuse list and a filter list in operation requires the use of data bits that indicate which list each cache element is a part of. Ordering of each list, both independently and as a combined global list, must be done quickly and efficiently for optimal operation of a high-speed cache in order to realize the benefits derived from a greater cache hit-to-miss ratio. An embodiment of a LRUP cache employing a reuse list indicator bit is discussed here as an example of one way of managing the reuse and filter lists in such a cache.

Distinguishing between cache elements that are members of the reuse or filter lists can be easily accomplished in such a cache by examining the reuse bit associated with each cache element. For example, in FIG. 4, if the cache element is a member of the reuse list, the reuse bit is set to 1, as for ways one and two. If the element is a member of the filter list, the reuse bit is set to zero, as for ways zero and three. When the cache controller must determine the LRU way of either the filter list or the reuse list to execute one of the processes described as part of the LRUP cache, the global list must be separated into two lists, with order of use preserved for at least that list the cache controller is seeking order of. This process is referred to as sub-list ordering extraction, and one example of such a process is explained here.

The goal of sub-list ordering extraction in our example method is to produce a re-ordered global list, such that the LRU element of the global list is also the LRU element of the sub-list undergoing extraction. A scheme for re-inserting elements of the sub-list not under extraction into MRU positions of the global list is disclosed here, and retains the order of the list under extraction to ensure proper identification of the list LRU bit but loses element order information for the list not under extraction.

Figure 4:
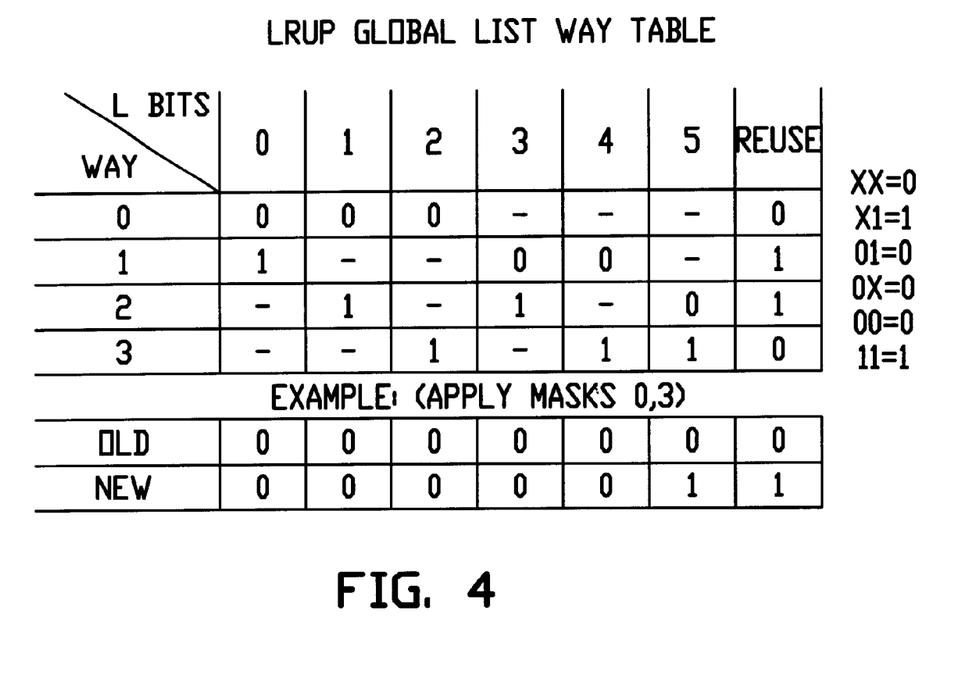
FIG. 4 shows a table representing sub-list ordering masks and an example of application of such masks to a LRU word with associated LRU way protection bits, consistent with an embodiment of the present invention.

Referring again to FIG. 4, an extraction of the LRU element of the reuse list is illustrated. The sublist under extraction (the reuse list) consists of elements one and two as indicated by the associated reuse bits, which also indicate elements zero and three are members of the sublist not under extraction. Each row numbered to represent elements 0–4 in FIG. 4 represents a mask that is applied to the array L if a member of the list not under extraction to derive a new array. This new array represents the reordered global list wherein the LRU is the LRU of the sublist under extraction.

For example, the row marked "old" represents the original LRU list, indicating an order of 3,2,1,0, where 3 is the least recently used and 0 is the most recently used cache element. Because we are extracting the reuse list, masks for elements 0 and 3, which are not a part of the reuse list, are applied to the array L. This yields a new array, shown in the row marked "new", which accurately reflects the order of the elements in the list under extraction, while ensuring the array indicates the elements of the list not under extraction are in the MRU positions. But, because the masks for the elements not a part of the list under extraction are applied to the old array L in an order not representing their old position in the array L, the order information for the list not under extraction is lost.

In this particular example, the new array (0,0,0,0,1,1) represents an order of 2,1,0,3, where 2 is the LRU element and 3 is the MRU element. Because the masks for way 0 and 3 were applied in random order, the new array indicates 3 is more recently used than 0, when in fact 0 is more recently used than 3. But, because this information is not saved back to array L and because we are only interested in preserving the ordering of the list under extraction, this type of error does not matter in this application.

Extraction of the sublist by creating a new array can be done using combinational logic in one implementation, and therefore can be completed very quickly. Other embodiments exist which derive order of a sublist differently, and so may include retaining order of the sublist not under extraction. After creation and use of the new array in sublist extraction, the new array is not written back to the old array L. Therefore, array L remains intact, retains the actual element order, and is available for repeated nondestructive extraction of sublists using methods such as combinational logic as needed.

Figure 5:
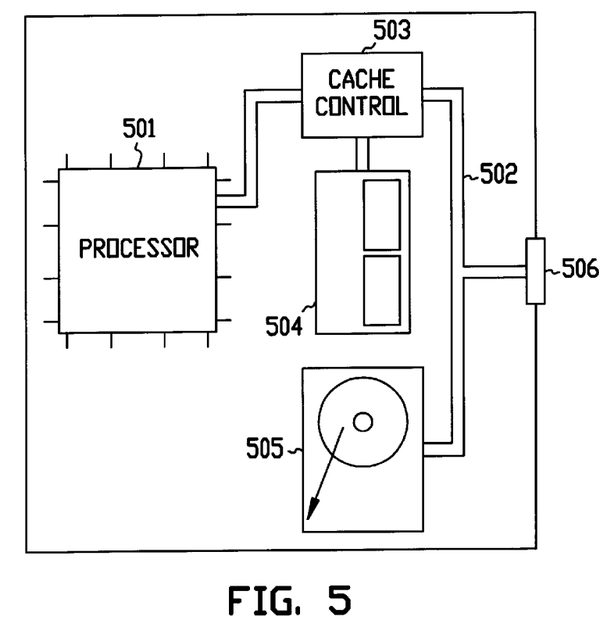
FIG. 5 illustrates a general purpose computer with a processor, memory, and LRUP cache, consistent with an embodiment of the present invention.

A cache system such as is described herein may be a part of a processor for use in a computer, such as in the system shown in FIG. 5. The cache system need not be a part of the processor core, but can be implemented as a part of a larger processor module, as a separate device, or otherwise connected to the processor. The system has a processor core 501, which is attached to a system bus 502. The system bus and processor are linked by a cache controller 503, which is also connected to a cache 504. The bus is connected to data storage such as hard disk drive 505, and to one or more input/output ports such as port 506. The cache controller receives memory fetch requests from the processor, and fills the requests from cache if the requested data is stored therein, or else from main memory. The cache controller maintains data in the cache 504 in accordance with the present invention as described previously, using a LRUP method of cache element replacement.

A cache controller such as cache controller 503 may be physically implemented as logic on an integrated circuit, such that at least a part of the integrated circuit is operable to maintain data in a cache using the LRUP method as described previously. For example, an integrated circuit with modules thereon that are capable of performing the functions of dividing a cache into a reuse and filter list, of populating the reuse and filter lists and of evicting data entries from the reuse and filter lists as has been described herein is consistent with an embodiment of the invention. It is specifically contemplated that the invention may be practiced by circuitry comprising at least part of a processor or processor module, a motherboard chipset, a cache controller chip, or other integrated circuit, all of which are to be considered within the scope of the invention.

Figure 6:
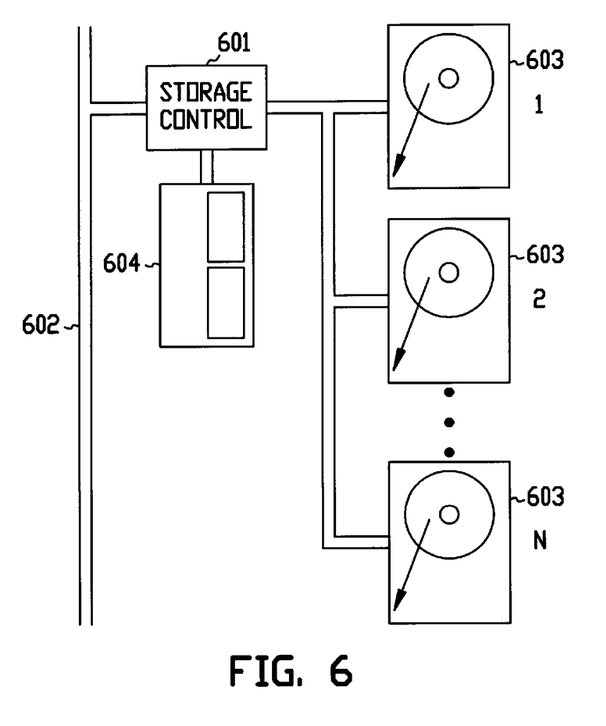
FIG. 6 shows a data storage system that incorporates a LRUP cache, consistent with an embodiment of the present invention.

FIG. 6 shows a data storage subsystem. The system comprises a storage controller 601 connected to a system bus 602 of a computer system. The storage controller is also connected to one or more hard disk drives 603, generally used as nonvolatile storage for large amounts of data. The storage controller is further connected to a cache 604, which is able to store and retrieve data more quickly than the hard disk drives 603, but typically is more expensive and so has a smaller capacity. The storage controller 601 serves requests to store and retrieve data from the hard disk drives, and maintains frequently used data in the cache 604. The cache controller manages the data in the cache in accordance with the description of an LRUP cache provided herein.

The LRU with protection as described above offers substantial performance benefits over traditional LRU replacement methods by providing solutions to common problems with traditional LRU replacement. By dividing a cache entry list into a filter sublist and a reuse list, population and protection processes can be implemented to reduce associativity and capacity displacement. New cache entries are initially stored in the filter list, and the reuse list is populated with entries promoted from the cache list. Eviction from the filter list and reuse list is done by a protection process that evicts a data entry from the filter, reuse, or global cache list. Many variations of protection and eviction processes are discussed above, along with the benefits each provides in reducing the effect of unwanted displacement problems present in traditional LRU replacement.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

We claim:

1. A method of storing data in a cache memory system, comprising:
   creating a cache data entry list containing a list of data stored in cache memory;
   dividing the cache data entry list into a reuse list and a filter list;
   populating the filter list by allocating all new cache data entries to the filter list;
   populating the reuse list by a promotion process; and
   evicting cache data entries from the filter and reuse lists by operation of a protection process.

2. The method of claim 1, wherein dividing the cache data entries into a reuse list and a filter list is done by setting a reuse bit associated with each cache data entry to a predetermined value.

3. The method of claim 1, wherein populating the reuse list comprises promoting to the reuse list those cache data entries accessed while a part of the filter list.

4. The method of claim 1, wherein populating the reuse list comprises promoting to the reuse list those cache data entries selected by a nomination process.

5. The method of claim 1, wherein populating the reuse list comprises promoting cache data entries from the filter list to the reuse list at random.

6. The method of claim 5, wherein cache data entries are promoted from the filter list to the reuse list at random only upon a cache miss, where a cache miss is a request for data not currently stored in cache.

7. The method of claim 1, wherein populating the reuse list further comprises randomly allocating new cache data entries to the reuse list.

8. The method of claim 1, wherein evicting cache data entries from the reuse or filter list comprises:
   calculating the length of each of the reuse and filter lists;
   comparing the length of each sublist to a desired length;
   receiving a new cache data entry to be stored in cache memory;
   evicting a cache data entry from either list to provide a storage location for the new cache data entry, where the evicted cache data entry is from a list selected based on the comparison of calculated length to desired length.

9. A computerized system operable to store and retrieve data electronically and implementing a cache, wherein storing data in the cache comprises:
   creating a cache data entry list containing a list of data stored in cache;
   dividing a cache data entry list into a reuse and a filter list;
   populating the filter list by allocating all new cache data entries to the filter list;
   populating the reuse list by promoting cache data entries from the filter list; and
   evicting cache data entries from the filter and reuse lists by operation of a protection process.

10. A method of storing data in a cache memory, comprising:
   creating a cache data entry list containing a list of data stored in cache memory;
   dividing a cache data entry list into a reuse and a filter list;
   tracking order of use of each cache data entry of the cache data entry list;
   populating the filter list by allocating all new cache data entries to the filter list;
   populating the reuse list by promoting cache data entries from the filter list; and
   evicting cache data entries from the filter and reuse lists by operation of a protection process.

11. The method of claim 10, wherein populating the reuse list further comprises promoting to the reuse list those cache data entries accessed while a part of the filter list.

12. The method of claim 10, wherein populating the reuse list further comprises promoting a cache data entry from the filter list to the reuse list if used while the cache data entry is in the filter list but is not the most recently used cache data entry in the filter list.

13. The method of claim 10, wherein populating the reuse list further comprises promoting a cache data entry from the filter list to the reuse list if used while the cache data entry is in the filter list but is not the most recently used cache data entry in the cache data entry list.

14. The method of claim 10, wherein populating the reuse list further comprises randomly selecting newly stored cache data entries for inclusion in the reuse list.

15. The method of claim 14, wherein random selection of newly stored cache data entries for promotion to the reuse list becomes increasingly unlikely as the size of the reuse list grows larger.

16. The method of claim 10, wherein the protection process further comprises:
   counting cache misses while the least recently used cache data entry of the reuse list remains unchanged in a strike counter, where a cache miss is a request for data not currently stored in cache;
   comparing the strike counter to a maximum allowable strike threshold;
   evicting the least recently used cache data entry of the cache data entry list if the value of the strike counter is greater than the maximum allowable strike threshold.

17. The method of claim 10, wherein the protection process further comprises:
   incrementing a counter for each reference to the least recently used cache data entry of the reuse list;
   decrementing the counter for each reference to the least recently used cache data entry of the filter list;
   calculating a maximum reuse list size based on the counter value;
   calculating the actual reuse list size;
   evicting the least recently used cache data entry of the cache data entry list if the actual reuse list size is larger than the maximum allowable reuse list size;
   evicting the least recently used cache data entry of the filter list if such a cache data entry exists and if the actual reuse list size is not larger than the maximum allowable reuse list size; and
   evicting the least recently used cache data entry of the cache data entry list if the filter list is empty and the actual reuse list size is not larger than the maximum allowable reuse list size.

18. The method of claim 17, further comprising:
   comparing the counter to a threshold value;
   generating a maximum reuse list size based on the value of the counter relative to the threshold value.

19. The method of claim 10, wherein the protection process further comprises:
   incrementing a counter for each second consecutive reference to the least recently used cache data entry of the reuse list;
   decrementing the counter for each reference to the least recently used cache data entry of the filter list;
   calculating a maximum reuse list size based on the counter value;
   calculating the actual reuse list size;
   evicting the least recently used cache data entry of the cache data entry list if the actual reuse list size is larger than the maximum allowable reuse list size; and
   evicting the least recently used cache data entry of the filter list if such a cache data entry exists and if the actual reuse list size is not larger than the maximum allowable reuse list size; and
   evicting the LRU cache data entry of the cache data entry list if the filter list is empty and the actual reuse list size is not larger than the maximum allowable reuse list size.

20. The method of claim 10, wherein the protection process further comprises:
   incrementing a counter for each consecutive reference to the least recently used cache data entry of the cache data entry list;
   decrementing the counter for each reference to the least recently used cache data entry of the filter list;
   calculating a maximum reuse list size based on the counter value;
   calculating the actual reuse list size;
   evicting a least recently used cache date entry of the cache data entry list if the actual reuse list size is larger than the maximum allowable reuse list size;
   evicting the least recently used cache data entry of the filter list if such a cache data entry exists and if the actual reuse list size is not larger than the maximum allowable reuse list size; and
   evicting the least recently used cache data entry of the cache data entry list if the filter list is empty and the actual reuse list size is not larger than the maximum allowable reuse list size.

21. An integrated circuit with circuitry thereon that is operable store data in a cache, that in operation:
   divides a cache data entry list into a reuse and a filter list;
   tracks order of use of each cache data entry of the cache data entry list;
   populates the filter list by allocating all new cache data entries to the filter list;
   populates the reuse list by promoting cache data entries from the filter list; and
   evicts cache data entries from the filter and reuse lists by operation of a protection process.

22. A computerized information handling system operable to store and retrieve data electronically and that comprises a cache, where storing data in the cache comprises:
   dividing a cache data entry list into a reuse and a filter list;
   tracking order of use of each cache data entry of the cache data entry list;
   populating the filter list by allocating all new cache data entries to the filter list;
   populating the reuse list by promoting cache data entries from the filter list; and
   evicting cache data entries from the filter and reuse lists by operation of a protection process.

* * * * *

UNITED STATES PATENT AND TRADEMARK OFFICE
CERTIFICATE OF CORRECTION

PATENT NO. : 6,393,525 B1
DATED : May 21, 2002
INVENTOR(S) : Christopher B. Wilkerson and Nicholas D. Wade It is certified that error appears in the above-identified patent and that said Letters Patent is hereby corrected as shown below:

<u>Title page,</u>
Item [56], OTHER PUBLICATIONS, delete "Disclaosure" and insert -- Disclosure --, therefor.

<u>Column 3,</u>
Line 50, delete "A0, A1" and insert -- A10, A11 -- therefor.
Line 67, delete "e" and insert -- be --, therefor.

<u>Column 4,</u>
Lines 2, 4, 7 and 20, delete "(I)" and insert -- (i) --, therefor.

<u>Column 12,</u>
Line 25, delete "date" and insert -- data --, therefor.

Signed and Sealed this

Eighth Day of October, 2002

Attest:

Attesting Officer

JAMES E. ROGAN
*Director of the United States Patent and Trademark Office*